United States Patent [19]

Herz

[11] 4,002,980
[45] Jan. 11, 1977

[54] RELAY STATION IN A TELECOMMUNICATIONS TRANSMISSION SYSTEM

[75] Inventor: Rudolf Herz, Munich, Germany

[73] Assignee: Siemens Aktiengesellschaft, Berlin & Munich, Germany

[22] Filed: Jan. 24, 1975

[21] Appl. No.: 544,003

Related U.S. Application Data

[63] Continuation of Ser. No. 275,707, July 27, 1972, abandoned.

[30] Foreign Application Priority Data

Aug. 4, 1971 Germany .......................... 2139049

[52] U.S. Cl. ............................. 325/3; 179/15 FD; 325/9; 325/157; 343/101
[51] Int. Cl.² ........................................ H04B 7/14
[58] Field of Search ............... 325/1, 3, 4, 9, 11, 325/7, 10, 157; 178/2 E; 179/15 FD, 15 PE; 328/105; 330/126; 331/60, 74; 343/100 ST, 101, 200

[56] References Cited

UNITED STATES PATENTS

| 3,102,167 | 8/1963 | Barton | 179/15 |
| 3,806,653 | 4/1974 | Sommer | 179/15 FE |

OTHER PUBLICATIONS

"A Satellite System for CATV", Q. B. McClannan et al., July, 1970, Proc. of IEEE Vol. 58, No. 7 pp. 987–1001.

Primary Examiner—Robert L. Griffin
Assistant Examiner—Marc E. Bookbinder
Attorney, Agent, or Firm—Hill, Gross, Simpson, Van Santen, Steadman, Chiara & Simpson

[57] ABSTRACT

A relay station for use in a communications transmission system, and particularly well suited for use in an earth satellite, employing a common carrier source for supplying carrier to a plurality of superheterodyne transmitters at a power level which is low compared to the total power required by the transmitters and a further carrier to be used as a beacon signal.

3 Claims, 4 Drawing Figures

RELAY STATION IN A TELECOMMUNICATIONS TRANSMISSION SYSTEM

This is a continuation, of application Ser. No. 275,707, filed July 27, 1972, now abandoned.

BACKGROUND OF THE INVENTION

1. Field of the Invention

The present invention relates to relay stations for use in a telecommunications transmission system.

2. Description of the Prior Art

In transmission systems which operate using a radio link, it is frequently impossible to establish a direct radio link between the two terminal stations. In such cases, the radio link is split into two or more sections which are in each case connected by a relay station. These relay stations receive from the preceding (in the direction of transmission) radio link section the radio frequency signals modulated by the information, and relay them to the succeeding (in the direction of transmission) radio link section, and thus to the next relay station or terminal station, in the form of radio frequency signals. For reasons associated with decoupling the receiving section from the transmitting section in a relay station, in the latter, the radio frequency signals of the transmitting section are shifted in frequency with respect to those of the receiving section. In radio relay links, particularly those operating over very long distances, instead of the large number of relay stations which would otherwise be required and would be connected across the surface of the earth in a chain, frequently a satellite link is used in which the transmitting ground terminal station sends its radio frequency signals to a relay station contained in the satellite at an appropriate height above the earth's surface. The satellite relay station radiates these radio frequency signals at a different frequency to another ground station or terminal station. In radio relay links of this kind, the receivers are designed as superheterodyne receivers and the transmitters as superheterodyne transmitters. The connection of the receivers with the transmitters of the relay station is generally effected by providing that the received radio frequency signal is transposed to a lower, intermediate frequency and thence converted by a superheterodyne transmitter to the radio frequency which is to be used for transmission. For this purpose, the frequency band of the intermediate frequency signal is split into several adjacent sub-bands by means of frequency multiplexer filters, in systems which have several transmission channels. The sub-bands are in each case independently amplified and, using a suitable carrier frequency, are converted in a corresponding number of superheterodyne transmitters to the radio frequency which is to be used for transmission. Because the carrier frequency is the same for all the superheterodyne transmitters, the individual radio frequency sub-bands obtained in this manner are united to form the overall transmitted radio frequency band.

In satellite communications relay stations, the further factor has to be borne in mind that for reasons of reliability the corresponding units must be designed so that their active sections incorporate a redundancy and accordingly, in the case of the superheterodyne transmitter in particular, a considerable amount of carrier power is required. In the context of transpondence of this kind, it has been provided that the carrier frequencies required for the individual superheterodyne stages be produced by separate oscillators, these oscillators controlling the desired frequencies by means of special synchronizing devices, in particular an injection synchronizing system.

In the context of earth-bound radio relay systems for use by public communication systems, a system which differs from this is employed. In these systems, the individual relay station operates with a single intermediate frequency band. If more channel capacity is required, several radio relay links, i.e., several radio frequency channels, are combined to form a large group in which the channels are disposed adjacent to one another in a relatively narrow radio frequency band. Accordingly, in these systems, a large number of carrier frequencies are required for frequency transposition by the different superheterodyne receivers and superheterodyne transmitters. These carrier frequencies must have high frequency stability. The circuits for generating these carrier oscillations are accordingly relatively elaborate where systems of any size are concerned. In some radio relay systems, therefore, the technique of a so-called central carrier supply has been adopted in which, commencing from several master generators, the corresponding carrier frequencies are produced by frequency conversion operations using preceding and succeeding filters. An example of this kind of carrier supply arrangement is described in the magazine "The Bell System Technical Journal," 1961, Volume 40, pages 1569 to 1586.

SUMMARY OF THE INVENTION

The object of the invention is to provide a relay station for use in communications systems, in which the necessary expense is substantially reduced, and in which the strict conditions which apply to the carrier supply in the transmission systems described above are met.

According to the present invention, there is provided a relay station for use in a communications transmission system, including a superheterodyne receiver in which the frequencies of the received radio frequency band are converted to an intermediate frequency, and including a divider circuit connected to the output of the receiver, in which divider circuit the intermediate frequency band is split into several sub-bands of separate frequencies which are disposed adjacent one another, each of the intermediate frequency sub-bands having its own particular frequency and being assigned its own sub-band amplifier and ensuing superheterodyne transmitter. To the output of each transmitter, which has a transmitter amplifier whose type is the same with respect to all the individual sub-bands, is connected the outputs of all of the transmitter amplifiers. The outputs of the amplifiers are combined via a further divider circuit, wherein, for the superheterodyne transmitters, a common carrier source is provided which comprises a stable frequency oscillator which produces the carrier at the requisite frequency and at a low power in comparison with the total power required for the individual superheterodyne transmitters. The output of the oscillator is connected to a carrier amplifier whose output is connected by way of power divider network to the individual superheterodyne transmitters.

Preferably, the carrier oscillator also amplifies the carrier for the superheterodyne receiver and, if a band filter divider is connected to the carrier amplifier output, the band filter divider is so designed that cross-modulation products of the type $(2f_2 - f_1)$, where $f_1$ and $f_2$ are the frequencies of the carriers for the superheterodyne transmitter and receiver, respectively, and also the noise component power at the signal frequencies, are suppressed.

When employed in a satellite communications system, it is advantageous if one of the two carriers which is taken from the output of the carrier amplifer is simultaneously utilized as a beacon signal.

Preferably, the carrier for the superheterodyne transmitters and the carrier serving as beacon signal for the superheterodyne receiver, are commonly supplied across the carrier amplifer, a modulator being disposed in the line carrying the carrier for the superheterodyne receiver, which carrier also serves as beacon signal. An advantageous embodiment of this type of relay station is one in which the modulator is connected at a point in the circuit employed to produce the carrier which is utilized as a beacon signal, at which point the frequency and level of the signal appearing there are low compared with the frequency and level of the carrier produced by the circuit as the beacon signal.

BRIEF DESCRIPTION OF THE DRAWINGS

Other objects, features and advantages of the invention, its organization, construction and operation in accordance with preferred embodiments thereof is set forth in detail below in conjunction with the accompanying drawings, on which.

DESCRIPTION OF THE PREFERRED EMBODIMENTS

Figure 1:
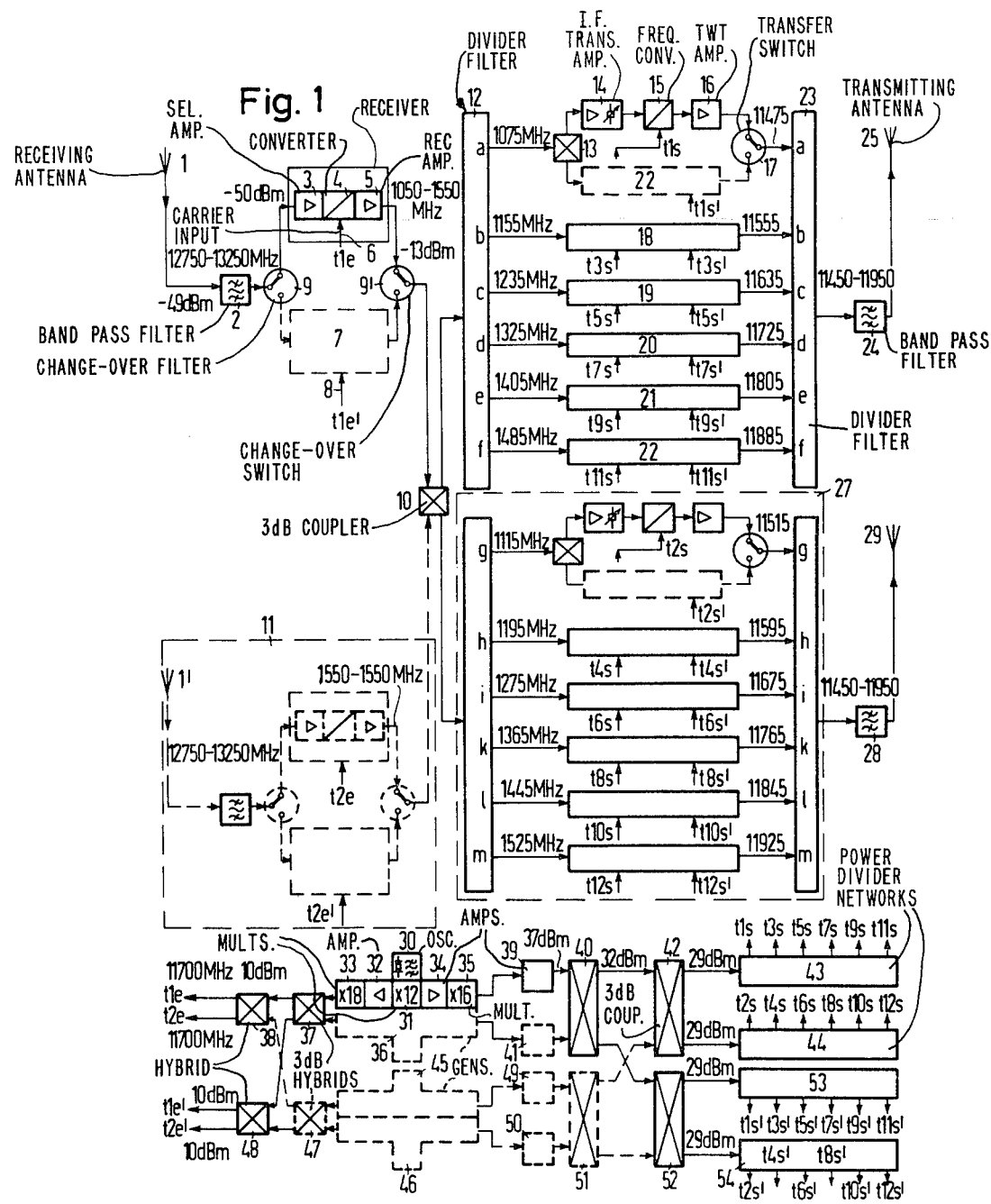
FIG. 1 is a block circuit diagram of a relay station for a communications satellite with 12 transmission channels, constructed in accordance with the invention.

In FIG. 1, via an antenna 1 or 1', a received signal is picked up, this signal being contained within a radio frequency band of, for example, 12750 to 13250 MHz. This frequency band is transmitted through a band pass filter 2 having a corresponding pass band, to a changeover switch 9' which enables this signal to be applied to an actual receiver 3, 4, 5, 6 or if the latter breaks down, to a correspondingly designed, that is to say redundant receiver 7, 8. The output signal is taken from the changeover switch 9' and supplied to a 3 dB coupler 10. In the receiver, the reference numeral 3 indicates a selective amplifier which produces a gain of, for example, 20 dB. A receiver converter 4 transposes the complete frequency band from 12750 MHz to 13250 MHz down to an intermediate frequency of, for example, 1,050 to 1,550 MHz. To this end, a carrier oscillation $t1e$ is supplied thereto through a line 6. The output product at the aforesaid high intermediate frequency, is amplified in the amplifier 5, this in fact selectively and by, for example, 24 dB. Therefore, if the radio frequency signal had a level of -49 dBm at the terminal of the antenna 1, then at the output of the receiver 5 a level of about -13 dBm will appear. The overall receiver installation extending from elements 1 to 9', is duplicated for redundancy purposes, and provided with the collective reference numeral 11.

To the two conjugate outputs of the 3 dB coupler 10, two intermediate frequency and transmitter amplifiers, such as 14, whose basic circuits are identical to each other, are connected. Because the radio frequency band comprises a total of 12 channels each having a bandwidth of about 36 MHz, in the intermediate frequency signal from the amplifier 5 all the 12 channels are arranged side by side in order of frequency. Commencing from the lowest frequency, all of the odd-numbered channels are processed in the upper (in the drawing) intermediate frequency or transmitter amplifier, while all of the even numbered channels are processed in the intermediate frequency or transmitter amplifier 27 shown below that. The odd-numbered channels are marked $a$ to $f$ and the even-numbered channels $g$ to $m$. The center frequencies of the individual channels can be seen from FIG. 1 of the drawings, for example the channel $a$ having a center frequency of 1075 MHz. The sub-division of the individual channels from the frequency point of view, is effected by a filter divider 12 in the case of channels $a$ to $f$. Advantageously, in this filter divider the compensation of the individual channel delays will take place at the same time. The sub-division into even-numbered and odd-numbered channels simplifies the technical requirements which the filter dividers 23 following the transmitter converters have to satisfy, because in this way the frequency interval between neighboring channels can be kept adequately large, that is to say equivalent to a channel bandwidth. Compared with the transmission channel $a$, the intermediate frequencies of the channel $a$ whose center frequency is 1075 MHz, are supplied to a hybrid circuit 13, e.g., a 3 dB coupler, and split into two identical signal components. Assuming the levels quoted introductorily, at the output of the hybrid circuit 13 the level in the individual channel is about -35 dBm. This is first of all amplified in a variable-gain amplifier 14 to a level of about -10 dBm. Then the signal is supplied to a frequency converter 15, which transposes it to the radio frequency of 11475 MHz which is to be transmitted. To this end, the frequency converter is supplied with a carrier frequency $t1s$ at 10400 MHz at a level of about 20 dBm. The output signal is amplified in an ensuing traveling wave tube amplifier 16 to a level of about 41 dBm and injected across a change-over(transfer)switch 17 into a further divider filter 23. The divider filter 23 combines the amplifier channel signals $a$ to $f$. The channel $b$ contains the amplifier 18, the channel $c$ the amplifier 19, the channel $d$ the amplifier 20, the channel $e$ the amplifier 21 and the channel $f$ the amplifier 22. It should also be mentioned that the amplifier sequence 14, 15, 16 is duplicated to provide redundancy for each of the amplifiers, and connected by the second hybrid junction terminal of the hybrid circuit 13 as an amplifier section 22' to 17. The bandwidth of the individual amplifier is 36 MHz. It is essential that the carrier frequencies $t1s$, $t3s$, $t5s$, $t7s$, $t9s$, $t11s$, should in each case have the same frequency and this is chosen as 10,400 MHz in the example, in each case at the same level of about 20 dBm. If in one of the channel amplifiers of the channels $a$–$f$ within the block 14, 15, 16, the transfer switch in the individual channel amplifier is then placed into its other operating position and the standby amplifier 22' provided for redundancy purposes is activated. These standby amplifiers 22' likewise receive, a carrier, oscillation having a frequency of 10,400 MHz at 20 dBm. These carriers are marked $t1s'$, $t3s'$, $t5s'$, $t7s'$, $t9s'$, $t11s'$. The channel signals which are combined at the output of the divider filter 23 to form the overall radio frequency signal, are supplied to the transmitting antenna 25 at a frequency of 11,450 to 11,950 MHz across a corresponding bandpass filter 24. In the intermediate frequency or transmitter amplifier section 27, as already mentioned, the design is the same except that the frequencies of the channels are different. The carriers are provided with the reference numerals $t2s$, $t4s$, $t6s$, $t8s$, $t10s$, $t12s$, or with $t2s'$, $t4s'$, $t6s'$, $t8s'$ $t10s'$ and $t12s'$. Their frequencies are likewise 10400 MHz. Their level, too, is at around 20 dBm per carrier frequency.

As will be clear from the foregoing, this relay station concept requires two carrier frequencies for the different receiving and transmitting converters. For the receiving converters, carrier frequencies $t1e$, $t1e'$, $t2e$ and $t2e'$ are required. They all have the same frequency of 11700 MHz at a level of about 10 dBm. For the transmitting converters, the carriers $t1s$ to $t12s'$ are required all of which have a frequency of 10,400 MHz and each a level of about 20 dBm.

The generation of the carrier frequencies is effected centrally in the following manner: A crystal-controlled oscillator 30 generates a fundamental oscillation having a frequency of 54 MHz, the precise value being in fact 54.166 MHz. The frequency of this oscillation is multiplied by a factor of 12 in a multiplier 31, and supplied via amplifiers 32, 34 to two frequency multipliers 33 and 35. The multiplier 33 multiplies the output frequency from the multiplier 31, 18 times and the multiplier 35 multiplies it 16 times. The levels are so chosen in the example assumed here, that the output of the multiplier 33 is at a level of 18 dBm and at the output of the multiplier 35 a level of about -10 dBm is produced. The output signal from the multiplier 33 is supplied to a 3 dB coupler/hybrid circuit 37 and then distributed to the outputs $t1e$ to $t2e'$. This distribution is also aided by ensuring hybrid circuits 38 and 48 which are additionally supplied by the generating device 36 or 45 or 46 which provides the redundancy vis-a-vis the generator 30 to 35. Therefore, there is duplication both of the master generator section 30 to 35, in the form of the redundancy provided by the generator 36, and of this duplicate arrangement itself in the form of the generator groups 45 to 46. The output of the multiplier 35 or the output of the corresponding redundant parts of the generators 36, 45, 46, is in each case applied to identical amplifiers 39, 41, 49 and 50 which, in the example, are designed as traveling wave tube amplifiers and are of the same type as the traveling wave tube amplifiers 16 in the transmitter amplifiers. The gain of these traveling wave tube amplifiers is so chosen that their output level is for example 37 dBm. The outputs of the amplifiers 39, 41, 49 and 50 are so combined through hybrid circuits or 3 dB couplers 40 and 51, or 42 and 52 that each of the amplifiers, at a level of about 29 dBm in the example, drives power-divider networks 43, 44, 53 and 54 with the same power. It is sufficient, therefore, if in each case only one amplifier operates in order to fully supply all these power divider networks. It is clear from the structure illustrated in FIG. 1 which carriers, all of which have the same frequency and same level, are taken from the individual power divider networks.

From the block diagram of FIG. 1, it can be seen that despite multiply redundant design of the carrier supply arrangements, these have a relatively simple design and achieve high frequency stability for the least possible expense, and that for the carriers, exclusively, amplifiers which correspond to the type of amplifier employed in the transmitting amplifier sections, are used. The use of identical amplifiers is of particular importance in the context of satellite relay stations, because the application of components to a satellite station requires thorough and extraordinarily expensive type testing of each individual component.

Summarizing then, one can regard the system described making reference to the example, as follows: The relay station comprises two redundant receiver systems, channel dividers at an intermediate frequency of 1,050 to 1,550 MHz (IF multiplex), 12 redundant transmitters which are connected through radio frequency channel dividers, for example, with two antennae and a carrier supply system in accordance with the invention. The individual receiver system in each case contains a receiving antenna and two receivers, one of which is redundant. In the receivers, the signals of the twelve individual channels are commonly amplified. The second redundant receiver system is, like the operating system, connected across the common three dB coupler (circuit 10 in FIG. 1) to two IF multiplexers. One multiplexer has outputs for the six odd-numbered channels and the other outputs for the six even-numbered channels. The band filters of the IF multiplexers, however, must also block the neighboring channels because across the 3 dB coupler the signals of all the 12 channels are applied to its input. The redundant transmitters with their 36 MHz bandwidths are connected via three dB couplers, to the outputs of the IF multiplexers. A transmitter sequence comprises a variable-gain IF channel amplifier, an upward frequency converter and a traveling wave tube final stage amplifier. The individual channels are combined via RF multiplexers, and supplied to the antenna. The carriers for the receiver and transmitter converters are produced by a common carrier supply facility which is designed in accordance with the invention. The oscillator frequencies for the receiver mixers are in each case 11,700 MHz and those of all transmitter mixers 10,400 MHz; they are derived from a single crystal-controlled frequency of 54 MHz. The transmitters, when using this principle, operate at different intermediate frequencies. If redundancy is to be provided for in the manner shown in FIG. 1, along with complex switching devices which are undesirable for reasons of reliability, it is then advisable to continuously supply the four receiver mixers and the 24 transmitter mixers with the oscillator power (so-called "hot" redundancy).

If the redundant units are to have a redundant carrier supply, then in the event of failure of a transmitter, a transfer to the stand-by transmitter must take place and the complete redundant carrier supply system must be rendered operative. As far as the overall power balance of a communication satellite with twelve operational transponders, is concerned, the additional d.c. power for "hot redundancy" on the part of the carrier supply, is small and, in fact, a supply designed in accordance with the principles of the invention has less than 1/12th of the total power of the communications section of the satellite. In order to ensure reliability over the requisite operational life of 5 or 7 years which communications satellites should have, oscillator powers which are substantially higher than those required for their operation and those normally employed in terrestial applications (e.g., radio relay) are supplied to receiver and transmitter mixers. In the example, these powers are 10 dBm for the receiver mixer and 20 dBm for the transmitter mixer. If we take into account the high line losses at high frequencies, then a total power of 18 dBm is obtained for the receiver mixers and of 37 dBm for the transmitter mixers. Without resort to the above techniques, powers of this order, and the mentioned frequencies, can nowadays be achieved, if at all, only at very high expense merely by process of multiplication from a low crystal-controlled frequency.

Through the use, by way of radio frequency amplifier for the central carrier supply and in accordance with the invention, of a traveling wave tube amplifier of the same kind as that employed in the signal channel to do duty as the final stage amplifier for the transmitters, these difficulties can be overcome, however, at minimum expense. In particular in traveling wave tubes which have spiral delay lines, this is something which can very readily be achieved because these tubes have bandwidths of about one octave. The drive power of these tubes, because of their high gain, can readily be produced by frequency multipliers from a master generator (54 MHz) using semiconductor components. In this way, too, the thermal loading in the frequency multipliers (these are in particular passive elements) or their varactor diodes, can be kept very low so that the reliability is increased. The individual traveling wave tube amplifier can also be operated at a reduced cathode current compared with what would be necessary in normal applications, so that its thermal loading is also reduced while maintaining the efficiency.

Figure 2:
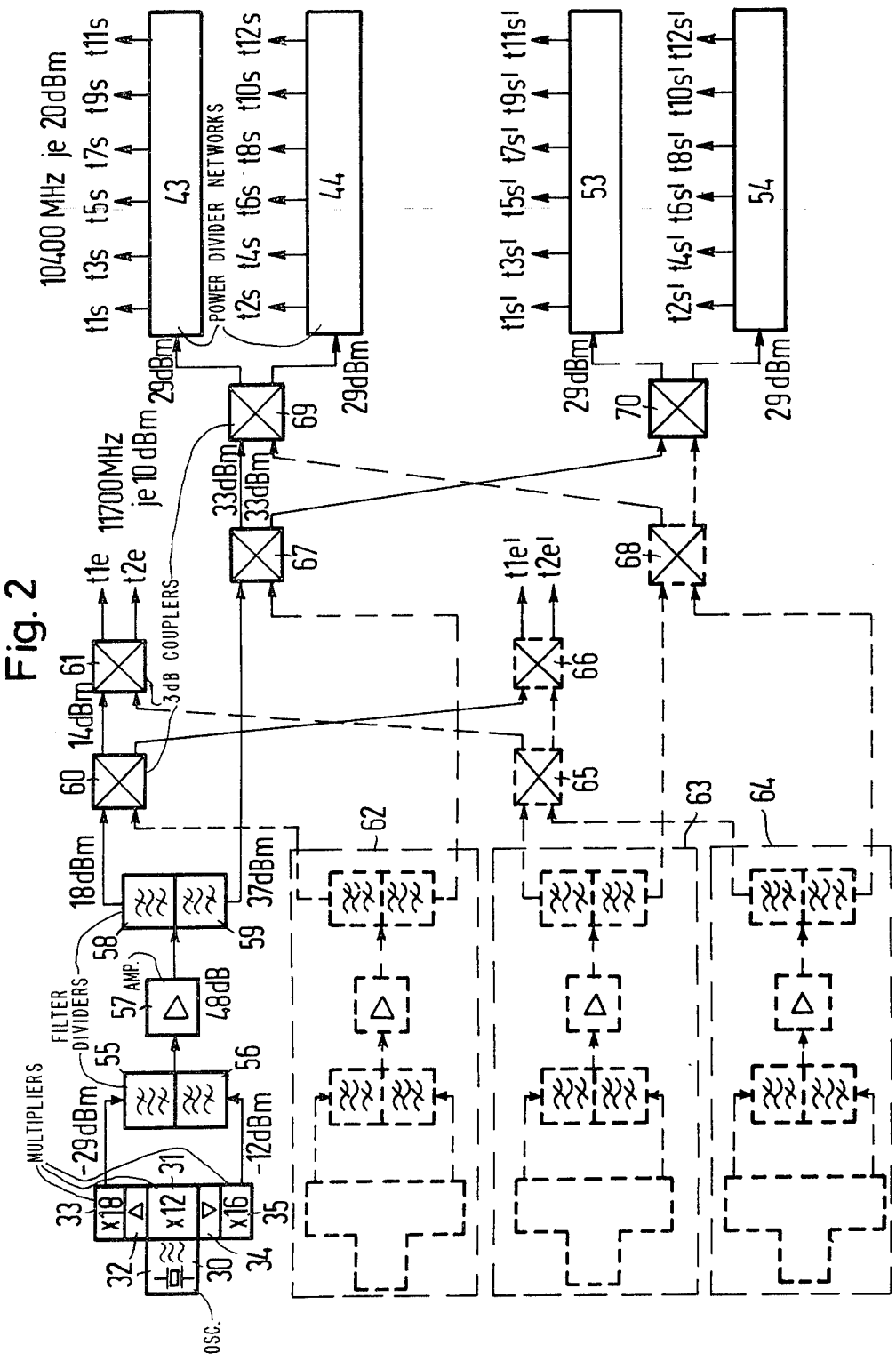
FIG. 2 is a block circuit diagram of a further form of carrier supply suitable for use in the relay station shown in FIG. 1.

In FIG. 2, a further development of the carrier supply system shown in FIG. 1 has been illustrated, the amplifiers being in particular dual-exploited traveling wave tube amplifiers. The reference numeral 30 once again designates the generator which, likewise, is preferably stabilized at an operating frequency of 54 MHz by crystal control. The reference numerals 32 and 34 denote corresponding amplifiers, while as before described, 31 is a multiplier (12 times) 33 and 35 a multiplier (16 times and 18 times respectively). The output level at the multiplier 33 is assumed to be -29 dBm for example, and the output level at the multiplier 35 is for example, -10 dBm. Through a filter divider 55, 56, the two output signals are combined and supplied to a common amplifier 57 which, for example, has a gain of 48 dB. The amplified output oscillatory signal from the amplifier 57 is split into its two frequency components in the filter divider 58, 59. For example, the output signal at the filter section 58 has a level of 18 dBm and the output signal at the filter section 59 has a level of 37 dBm. The entire device thus far described, is multiply repeated for redundancy reasons, in the form of the component assemblies 62, 63 and 64. A plurality of hybrid circuits or 3 dB couplers 60, 61, 65 and 66 serve to produce the carriers $t1e$, $t2e$, $t1c'$ and $t2e'$, each of which has a frequency of 11700 MHz in the example and at a level of about 10 dBm. The hybrid circuits or 3 dB couplers 67, 68, 69 and 70, serve, in association with the power divider networks 43, 44, 53 and 54 to derive the carriers for the transmitter converters which are marked $t1s$ and $t2s'$ in the example. The levels at the two outputs of the hybrid circuit 67 are, for example, 33 dBm and at the outputs of the hybrid circuits 69 and 70, in each case, 29 dBm. At the outputs of the divider networks 43, 44, 53 and 54, accordingly, carriers with a frequency of 10400 MHz and a level in each case of 20 dBm, are available.

As FIG. 2 illustrates, this kind of design achieves a still further appreciable reduction in the power which has to be supplied by the oscillator 30, 31, 32, 33, 34, 35, while the redundancy of the overall system is just as good.

For the carrier supply system in accordance with the invention, then, by way of example two advantageous solutions have been put forward. In the solution according to FIG. 1, only the power for the transmitter mixers is produced in a traveling wave tube; the low power for the receiver mixers is obtained directly by multiplication. In the solution of FIG. 2, both oscillator frequencies (11700 MHz for the receiver mixers and 10400 MHz for the transmitter mixers) are commonly supplied by the same traveling wave tube. The band filters, combined to form diplexers, before and after the traveling wave tube do not represent any appreciable extra expense because noise filtering is necessary anyway (the noise power of the oscillators at the signal frequencies, should be as low as possible). The band filters also block the cross-modulation products of the type $2f_2-f_1$ ($2 \times 11 \cdot 7$ GHz $-$ 10.4 GHz $=$ 13 GHz and $2 \times 10.4$ GHz $-$ 11.7 GHz $=$ 9.1 GHz). The second solution described enables a further simplification in the expense in the satellite to be achieved.

Figure 3:
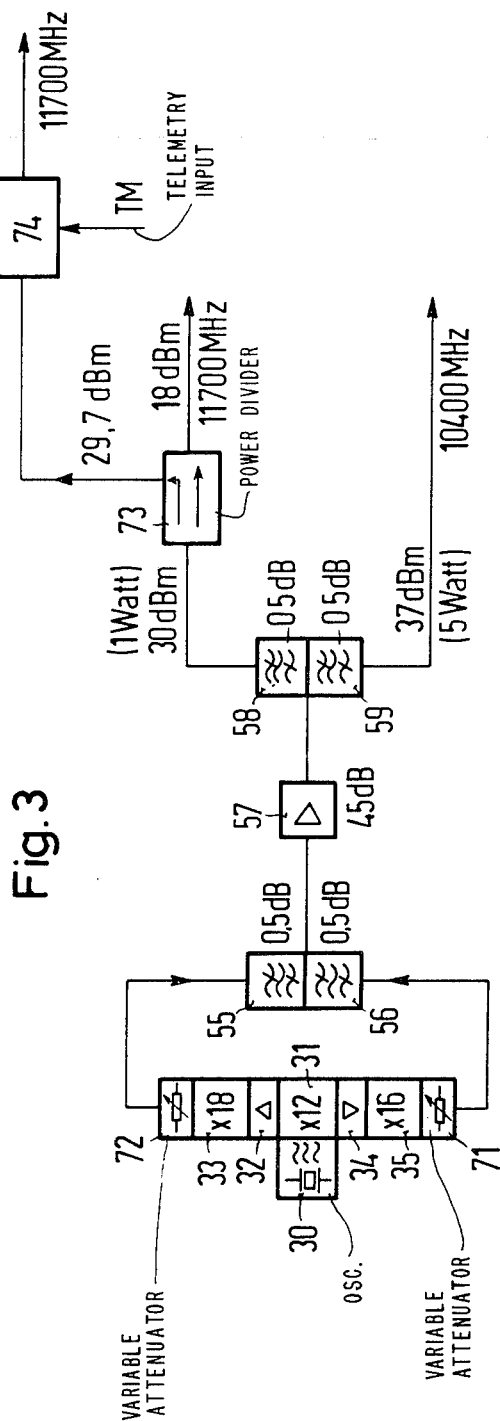
FIG. 3 is a block circuit diagram of one form of circuit for generating a beacon signal for use in a relay station in accordance with the invention.

In the case of the circuit illustrated in the form of a block circuit diagram of FIG. 3, a device is disclosed which in addition to the carriers at, for example, frequencies of 10,400 to 11,700 MHz also generates a beacon signal. This beacon signal here corresponds in frequency with the frequency of the carrier for the receiver converter 4 in FIG. 1. As far as the component assemblies 30, 31, 32, 33, 34, 35, 55, 56, 57, 58 and 59 are concerned, the device corresponds with that shown in FIG. 2. The only addition is a variable attenuator 71, 72 preceding the filter sections 55, 56 of the filter divider. These attenuation controls serve to adjust the level required at the input of the filter divider 55 and 56. The outputs of the filter divider 58 and 59 should be regarded as included within the overall concept in an identical manner to that shown in FIG. 2, i.e., they feed the distribution circuit 60, 61, 66, 67 of FIG. 2. In the output line of the section 58, however, there is additionally a power divider 73. By means of this power divider, a requisite proportion of the 11,700 MHz carrier is coupled out and applied to a phase modulator 74. The output of the phase modulator 74 supplies the beacon antenna of the satellite relay station. By way of a modulation signal, the phase-modulator 74 is supplied with a signal TM, for example in the form of telemetry data. In order to provide an illustration of the level conditions, referring now to FIG. 2, the essential levels can be seen by way of example in FIG. 3. At the input of the power divider 73, the signal has a level of 30 dBm, (corresponding to a value of 1 watt). At the output of the filter section 59, a level of 37 dBm is obtained (corresponding to 5 watts). The signal which is injected from the divider 73 into the modulator 74 has a level of 29.7 dBm and the signal produced by the divider 73 delivered to 60 has a level of 18 dBm.

Figure 4:
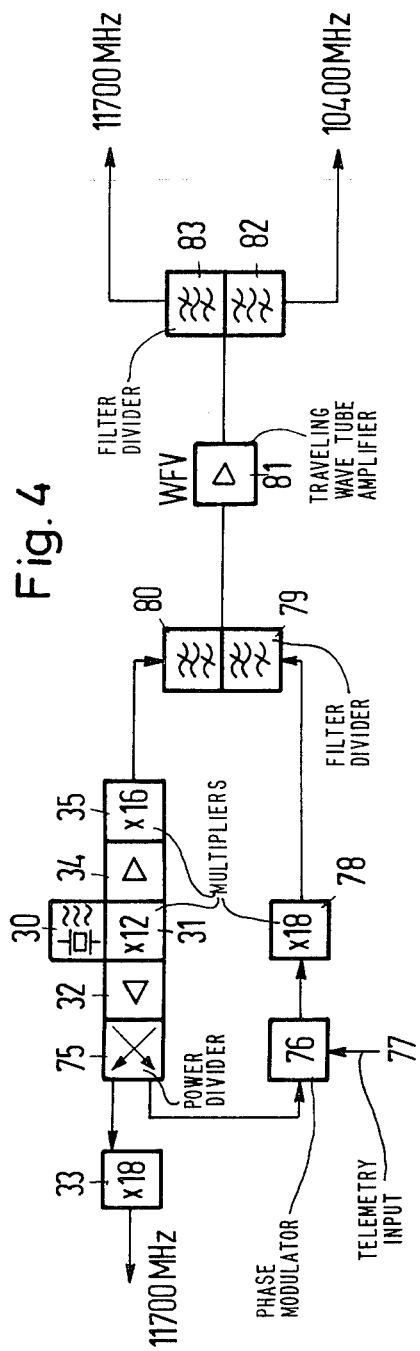
FIG. 4 is a block circuit diagram of one form of circuit for generating a carrier frequency for use in transmitting and receiving converters in a relay station in accordance with the invention and for producing a beacon signal and also for modulating same.

In FIG. 4, another circuit has been shown, again in the form of a block circuit diagram, which serves not only to generate the carriers for the receiver and transmitter converters, but also to generate the beacon signals (in the example a fixed frequency of 11,700 MHz). In this context, the beacon signal should additionally be capable of phase-modulation by telemetry signals. The reference numerals 30, 31, 32, 34 and 35 correspond to the same circuit modules shown in FIG. 2. At the output of the amplifier 32 a power divider 75 is connected which on the one hand supplies the multiplier 33 which is equivalent to the similarly referenced multiplier shown in FIG. 1. The other terminal of the power divider 75 supplies a phase-modulator 76 to which, via an input 77, the telemetry signals used for phase-modulation are applied. Phase-modulated signals from the phase modulator 76 are multiplied (18 times) in frequency in a multiplier 78 and then combined through a filter divider 79, 80, with the carrier of different frequency, from the multiplier 35, being then supplied to an amplifier, in particular a traveling wave tube amplifier 81, for common amplification. The filter divider section 79 is therefore a band-pass filter for 11700 MHz and the filter section 80 is a band-pass filter for 10400 MHz. At the output of the traveling wave tube amplifier 81 a further filter divider 82, 83, is provided. The carrier of 11700 MHz possibly modulated by telemetry signals, is filtered out by the band-pass filter 83 and applied to the beacon antenna line. The carrier frequency of 10400 MHz for the transmitter converter (in FIG. 1 the component assemblies 15, 22' and in 18, 19, 20, 21, 22 and 27) is taken off via the filter 82.

Conveniently, the channel pattern will be so chosen that the oscillator frequencies are not located within the effective bandwidths. In the examples, to this end the frequency plan fundamentally proposed by the ESRO, (European Space Research Organization), should be slightly modified so that the transmitter channel center-to-center interval of 50 MHz is located not between channels eight and nine, but between channels six and seven. [The channel center-to-center interval between channels one to six and seven to twelve is 40 MC/s (see the frequency plan in FIG. 1)]. The oscillator frequency for the receiver mixers, namely 11700 MHz then falls precisely in the center of the protection band between channels six and seven (channel six: 12,957 to 12,993 MHz receiving band, 11,657 to 11,693 MHz transmitting band: channel seven: 13,007 to 13,043 MHz receiving band, 11,707 to 11,743 MHz transmitting band). If then, the drive power for the traveling wave tube amplifier at 11,700 MHz is increased, so much power can be produced that the major part of it can be employed as a beacon signal for tracking the satellite. Receiver oscillator frequency and beacon frequency then correspond, as in the example of FIG. 3. Consequently, the output power of the traveling wave tube amplifier can also be fully exploited and the provision of a beacon, otherwise required in communications satellites can be more economically realized. The beacon signal is simultaneously used in many communications satellites, as a carrier for telemetry signals. The telemetry modulation can be impressed upon the beacon signal even at a low level and at a low frequency, if the circuit shown in FIG. 4 is used. According to this principle, the low power required for the receiver oscillators is produced direct by multiplication (similarly to FIG. 1). The beacon signal is phase-modulated at a low frequency and low level and, together with the oscillator frequency for the transmitter mixers, amplified in a traveling wave tube amplifier to the requisite output level. Generally speaking, it can be stated too, as far as the principle of carrier supply proposed in accordance with the invention is concerned, that it is so designed as to enable redundancy to be chosen freely. The triple redundancy assumed in FIGS. 1 and 2, on the part of the carrier supply, can be reduced (because of the low thermal loading on all the active components) without too great a risk and selected to accord with the mass balance of the overall satellite.

Instead of traveling wave tube amplifiers, other wideband amplifiers with correspondingly high gains, can be used. For example, klystron amplifiers may be employed with networks as modulation and output circuits.

The carrier supply principle in accordance with the invention in association with the basic diagram of the relay station as shown in FIG. 1, is also suitable for application to terrestial radio relay techniques, but of course in this context means an absolute departure from the kind of design philosophy hiterto adopted in such applications. In radio relay stations with several radio frequency channels of adjacent frequencies, these have hitherto been applied, via a filter or directional hybrid divider serving for channel separation, to a corresponding number of receivers which all have the same intermediate frequency. The outputs of the receivers are conventionally connected to transmitters which transmit the corresponding frequency-shifted radio frequencies. These radio frequencies are combined by a filter divider or directional hybrid divider, and supplied to a common antenna. Because of the superheterodyne receiver and superheterodyne transmitter and the requirement for identical intermediate frequencies in the receivers and transmitters, in this kind of system a large number of carriers with mutually different frequencies are needed to supply the individual frequency converters. In the relay station system in accordance with the invention, this is reduced to two carriers so that the cost of the carrier supply arrangement is substantially reduced. This is particularly clearly apparent if one compares the radio relay system in accordance with the invention with the TH-radio relay system described in the magazine "The Bell System Technical Journal" Vol. 40, 1961, pages 1468 to 1471 and 1569 to 1586.

Although I have disclosed my invention by reference to specific illustrative embodiments, many changes and modifications thereof may become apparent to those skilled in the art without departing from the spirit and scope of the invention. I therefore intend to include within the patent warranted hereon, all such changes and modifications as may reasonably and properly be included within the scope of my contribution to the art.

What I claim is:

1. A relay station for use in a communications transmission system, including a source of carrier and a superheterodyne receiver in which the oscillations of the received radio frequency band are converted to an intermediate frequency, said receiver connected to said source of carrier, and including a first multiplexer filter circuit connected to the output of the receiver, in which the intermediate frequency band is split into a plurality of sub-bands of separate frequencies which are disposed adjacent one another, a plurality of sub-band amplifiers, each of the intermediate frequencies sub-bands, with its own particular frequencies, being assigned to a respective sub-band amplifier, a plurality of superheterodyne transmitters requiring respective transmitter carriers and connected to the outputs of respective ones of said sub-band amplifiers, a plurality of transmitter amplifiers of the same type with respect to the individual sub-bands connected to the outputs of respective ones of said transmitters, a second multiplexer filter circuit connected to and combining the outputs of all of said transmitter amplifiers, a common carrier source comprising a stable frequency oscillator which produces the transmitter carriers at the requisite frequencies and at a low power in comparison with the total power required for the individual superheterodyne transmitters, a power divider network, and a carrier amplifier, the output of said oscillator connected to said carrier amplifier and said carrier amplifier connected to the individual superheterodyne transmitters via said power divider network, wherein said carrier amplifier is connected with the receiver carrier source and the transmitter carrier source and also amplifies the carrier for the superheterodyne receiver, and comprising a band filter divider connected to the output of said carrier amplifier, said divider operating to provide suppression of the cross-modulation products of the type $2f_2 - f_1$, where $f_1$ and $f_2$ are the frequencies of the carriers for the superheterodyne transmitters and receiver, and operating to provide suppression of the noise power of the oscillator at the signal frequencies in the received frequency range.

2. A relay station for use in a communications transmission system, including a superheterodyne receiver in which the oscillations of the received radio frequency band are converted with a receiver carrier to an intermediate frequency, a first multiplexer filter circuit connected to the output of the receiver, in which the intermediate frequency band is split into a plurality of sub-bands of separate frequencies which are disposed adjacent one another, a plurality of sub-band amplifiers, each of the intermediate frequencies sub-bands, with its own particular frequencies, being assigned to a respective sub-band amplifier, a plurality of superheterodyne transmitters, each requiring a transmitter carrier and connected to the outputs of respective ones of said sub-band amplifiers, a plurality of transmitter amplifiers of the same type with respect to the individual sub-bands connected to the outputs of respective ones of said transmitters, a second multiplexer filter circuit connected to and combining the outputs of all of said transmitter amplifiers, a common carrier source comprising a stable frequency oscillator which produces the transmitter carrier at the requisite frequency and at a low power in comparison with the total power required for the individual superheterodyne transmitters, a power divider filter network, and carrier amplifier means, the output of said oscillator connected to said carrier amplifier means, and said carrier amplifier means having a first carrier output connected to the superheterodyne receiver, a second carrier output connected to the individual superheterodyne transmitters via said power divider filter network and a third carrier output, wherein said station is disposed in a satellite having a beacon signal constituted by said third output of the carrier amplifier means.

3. A relay station as claimed in claim 2, and comprising a modulator connected at said third output of said carrier amplifier means to modulate the beacon signal.

* * * * *